Patented June 29, 1926.

1,590,482

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND.

DYESTUFFS CONTAINING METALS AND PROCESS OF MAKING SAME.

No Drawing. Application filed April 7, 1925, Serial No. 21,439, and in Switzerland April 20, 1924.

This invention relates to new dyestuffs containing metals valuable for the production of fast tints, it comprises the new dyestuffs, the process of making same and the material dyed with the new dyestuffs.

It has been found, that new dyestuffs containing metals are obtained by combining the substitution products of the 1-hydroxynaphthalene-8-sulfamide with o-hydroxy diazo compounds not carrying any carboxyl group and containing at the most one nitrogroup, treating the dyestuffs thus obtained, corresponding with the general formula:

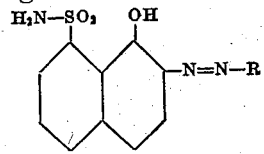

wherein the naphthalene nucleus contains at least one more substituent and in which R stands for an aromatic nucleus not carrying any carboxyl-group and containing at the most one nitro-group but carrying a hydroxy-group in ortho position to the azo bridge, with agents yielding metals, such as copper or chromium compounds. The azo-dyestuffs containing metals thus obtained form dark powders, dissolving in water with red to blue coloration yielding on wool, when dyed in an acid bath, fast violet to blue and dark green tints.

Example 1.

14,35 parts of 4-chloro-2-amino-1-hydroxybenzene are diazotized as usual and added to a solution of 30,3 parts of 1-hydroxynaphthalene-8-sulphamide-4-sulfonic acid, 10 parts of caustic soda and 25 parts of sodium carbonate in 200 parts of water. The mixture is stirred at 5–10° C. until the diazo-compound has disappeared, whereupon the new dyestuff is isolated by adding common salt. The new dyestuff corresponding with the formula:

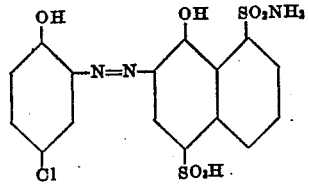

forms in a dry state a blackish powder, dissolving in dilute acetic acid solution and in dilute caustic soda solution with bluish-red, in dilute sodium carbonate with Bordeaux-red, in concentrated sulfuric acid with brownish Bordeaux-red colorations, dyeing wool in an acetic acid bath brown-red tints, which when afterchromed become violet, aftercoppered red-violet. The isomeric dyestuffs from 1-hydroxynaphthalene-8-sulfamide-3-sulfonic acid and the dyestuff from 1-hydroxynaphthalene-8-sulfamide-4-sulfonic acid and diazotized 4-nitro-aminophenol behave in an analogous manner. The dyestuff from diazotized 1-amino-2-hydroxynaphthalene-4-sulfonic acid and 1-hydroxynaphthalene-8-sulfamide-4-sulfonic acid dissolves in acidulated water with bluish-red, in dilute carbonate of soda solution with greenblue, in concentrated sulfuric acid with blue coloration. Its dyeings on wool, when after coppered, are violet, when after chromed dark blue; the isomeric dyestuff from 1-hydroxynaphthalene-8-sulfamide-3-sulfonic acid dissolves in sodium carbonate solution with violet, in concentrated sulfuric acid with violet coloration and shows similar properties.

Example 2.

14,3 parts of 4-chloro-2-amino-1-hydroxybenzene are diazotized in the usual manner and are introduced at 5–10° C. into a solution of 30,2 parts of 1-hydroxynaphthalene-3,8-disulfamide, 27 parts of caustic soda solution of 30 per cent strength and 10 parts of sodium carbonate in 90 parts of water. The mixture is stirred at 10° C. until coupling is complete, then diluted with 150 parts of water and poured into 140 parts of a solution of hydrochloric acid of 15 per cent strength. The dyestuff is salted out. It forms a dark powder, dissolving in dilute acetic acid solution and in dilute caustic soda solution with blue-red, in dilute sodium carbonate solution with violet, in concentrated sulfuric acid with black-violet coloration, dyeing wool in an acetic acid bath redviolet tints which become pure marine-blue and of good fastness when after chromed, and violet when after coppered.

Example 3.

Into a solution of 56 parts of caustic potash in 48 parts of water are introduced at 50° C. 30,2 parts of 1-hydroxynaphthalene- 4,8-disulfamide. After stirring for some time there is added at 45–50° C. the diazo-compound from 31,8 parts of 1-hydroxy-naphthalene-8-sulfamide-2-amino-4-sulfonic acid in the form of a paste of 49 per cent strength and at the last-named temperature. When coupling is complete the mass is diluted with 50 parts of cold water and the whole is poured into 200 parts of hydrochloric acid of 21 per cent strength, while stirring well; the new dye-stuff is then salted out. It forms a blackish powder dissolving in water acidulated with acetic acid, with bluish-red, in dilute caustic soda with red-violet, in dilute sodium carbonate solution with bluish-violet, in concentrated sulfuric acid with cyaneous coloration, dyeing wool in an acetic acid bath violet tints which pass to a pure greenish blue of excellent fastness when after chromed and to blue-violet when after coppered.

*Example 4.*

13,5 parts of 4-chloro-1-hydroxynaphthalene-8-sulfamide are introduced at 20° into a solution containing 27 parts of caustic potash and 30 parts of water and stirred at this temperature until the corresponding potassium salt has been formed. The mixture is then cooled at 10° and treated with 13,6 parts of the sodium salt of the diazo-compound of 1-amino-2-hydroxynaphthalene-4-sulfonic acid (in form of a paste of 50 per cent strength). Stirring is continued until the coupling is achieved, and the temperature is allowed to rise to 20°; the mixture is diluted with water, neutralized with dilute hydrochloric acid and the dyestuff thus obtained salted out. It forms a black powder, dissolving in water with Bordeaux, in caustic soda solution with red-violet, in concentrated sulfuric acid with blue coloration. The dyestuff dyes wool in an acid bath dull Bordeaux tints which become greenish-blue when after chromed. If the diazo-compound of the 1-amino-2-hydroxynaphthalene-4-sulfuric acid is substituted by the corresponding nitro-diazo-derivative, a dyestuff forming a dark powder is obtained dissolving in water with red-violet in dilute caustic soda solution with red-brown, in concentrated sulfuric acid with blue coloration and dyeing wool from an acid bath dull violet-Bordeaux tints, becoming black-green when after chromed.

The 4-chloro-1-hydroxynaphthalene-8-sulfamide forms a yellowish powder. It is obtained by causing to react ammonia on 4-chloro-1,8-naphthsultone.

*Example 5.*

42,3 parts of the dyestuff from 4-chloro-2-amino-1-hydroxybenzene and 1-hydroxy-naphthalene-8-sulfamide-4-sulfonic acid are dissolved in 800 parts of boiling water. To the solution is added a solution of chromium formate corresponding with 16 parts of $Cr_2O_3$ and the whole is boiled for a long time in the reflux apparatus. By evaporating and salting out the new chromium compound is obtained. It forms a blackish powder, dissolving in water with blue coloration and red appearance, in dilute caustic soda solution with red-violet coloration, dyeing wool in an acid bath violet tints with excellent properties of fastness. The isomeric dyestuff from 1-hydroxynaphthalene-8-sulfamide-4-sulfonic acid shows similar properties; the dyestuff from diazotized 4-nitro-aminophenol yields a somewhat redder tint.

*Example 6.*

Into 54 parts of an aqueous paste of chromium hydroxide containing 16,2 per cent of $Cr_2O_3$ there are introduced in small portions 60 parts of solid caustic potash until the whole $Cr(OH)_3$ is dissolved. To this solution are then added 57,3 parts of the dyestuff from 1-hydroxynaphthalene-8-sulfamide-4-sulfonic acid and diazotized 1-amino-2-hydroxynaphthalene-4-sulfonic acid and the mixture heated at 80° C. until the whole chromium has been absorbed by the dyestuff. The reaction mixture is then diluted with water, neutralized with mineral acid and the dyestuff thus obtained salted out with common salt. It forms a dark powder, dissolving in water with blue, in dilute caustic soda solution with violet coloration and dyeing wool in an acid bath blue fast tints. The chromium compounds of the dyestuffs described in the examples Nos. 2 and 3 yield on wool blue tints remarkable by their purity.

*Example 7.*

5 parts of the dyestuff from 4-chloro-1-hydroxynaphthalene-8-sulfamide and 1-amino-2-hydroxynaphthalene-4-sulfonic acid are dissolved in 100 parts of boiling water, treated with a chromium formate solution corresponding with 2,5 parts of $Cr_2O_3$ and boiled for some time in a reflux apparatus. The chromium-compound is then obtained by evaporating and salting out. It forms a blackish powder, dissolving in water with greenish-blue, in caustic soda solution with blue violet, in concentrated sulfuric acid with bluish-green coloration and dyeing wool in a sulfuric acid bath greenish-blue tints. The chromium compound of the dyestuff from 4-chloro-1-hydroxynaphthalene-8-sulfamide and the nitrated diazo-compound of 1-amino-2-hydroxynaphthalene-4-sulfonic acid forms a blackish powder dissolving in water with bluish-green, in concentrated sulfuric acid with blackish-blue, in concentrated caustic soda solution with violet coloration and dyeing wool in an acid bath dark green tints.

Example 8.

57.3 parts of the dyestuff from 1-hydroxy-naphthalene-8-sulfamide-3-sulfonic acid and the diazo-compound from 1-amino-2-hydroxynaphthalene-4-sulfonic acid are dissolved in 800 parts of hot water. There is added a concentrated solution of 27° parts of copper sulfate and the mixture is warmed for a short time. There are then added 15 parts of sodium acetate and the new dyestuff is salted out. The new dyestuff forms a dark powder, dissolving in water and dilute caustic soda solution red-violet tints, and yielding on wool in an acid bath fast violet tints. The copper-compounds of the other dyestuffs described in the first examples yield also red-violet to blue-violet tints on wool.

What we claim is:

1. The herein described process for the manufacture of new dyestuffs by combining the substitution products of the 1-hydroxy-naphthalene-8-sulfamide with o-hydroxy-diazo-compounds not carrying any carboxyl group and containing not more than one nitro group and treating the dyestuffs thus obtained with agents yielding metals.

2. The herein described process for the manufacture of new dyestuffs by combining the substitution products of the 1-hydroxy-naphthalene-8-sulfamide of which the substituents correspond with the general formula $-SO_2X$, ($X=OH$ or $NH_2$) with o-hydroxy-diazo-compounds not carrying any carboxyl group and containing not more than one nitro group and treating the dyestuffs thus obtained with agents yielding metals.

3. The herein described process for the manufacture of new dyestuffs by combining the substitution products of the 1-hydroxy-naphthalene-8-sulfamide of which the substituents are other sulfamide groups with o-hydroxy-diazo-compounds not carrying any carboxyl group and containing not more than one nitro group and treating the dyestuffs thus obtained with agents yielding metals.

4. The herein described process for the manufacture of new dyestuffs by combining the substitution products of the 1-hydroxynaphthalene-8-sulfamide with o-hydroxy-diazo-compounds not carrying any carboxyl group and containing not more than one nitro group and treating the dyestuffs thus obtained with agents yielding chromium.

5. The herein described process for the manufacture of new dyestuffs by combining the substitution products of the 1-hydroxy-naphthalene-8-sulfamide of which the substituents correspond with the general formula $-SO_2X$, ($X=OH$ or $NH_2$) with o-hydroxy-diazo-compounds not carrying any carboxyl group and containing not more than one nitro group and treating the dyestuffs thus obtained with agents yielding chromium.

6. The herein described process for the manufacture of new dyestuffs by combining the substitution products of the 1-hydroxy-naphthalene-8-sulfamide of which the substituents are other sulfamide groups with o-hydroxy-diazo-compounds not carrying any carboxyl group and containing not more than one nitro group and treating the dyestuffs thus obtained with agents yielding chromium.

7. As new products the metal-compounds of the dyestuffs of the general formula

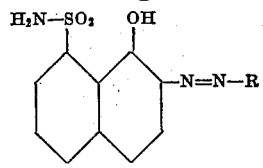

wherein the naphthalene nucleus contains at least one more substituent, R standing for an aromatic nucleus carrying a hydroxyl group in ortho position to the azo-bridge, not carrying any carboxyl group and containing at the most one nitro group, which dyestuffs form dark powders, dissolving in water with red to blue coloration and yielding on wool when dyed in an acid bath fast red-violet to blue and dark green tints.

8. As new products the metal-compounds of the dyestuffs of the general formula

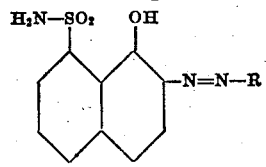

wherein the naphthalene nucleus carries one more substituent corresponding with the general formula $SO_2X$ ($X=OH$ or $NH_2$), R standing for an aromatic nucleus carrying a hydroxyl group in ortho position to the azo-bridge, not carrying any carboxyl group and containing at the most one nitro group, which dyestuffs form dark powders, dissolving in water with red to blue coloration and yielding on wool when dyed in an acid bath fast red-violet to blue and dark green tints.

9. As new product the metal compounds of the dyestuffs of the general formula

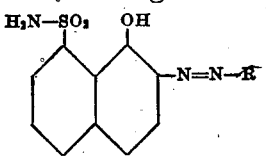

wherein the naphthalene nucleus carries one more $SO_2NH_2$ group, R standing for an aromatic nucleus carrying a hydroxyl group in ortho position to the azo-bridge, not carrying any carboxyl group and containing at the most one nitro group, which dyestuffs form dark powders, dissolving in water with red to blue coloration and yielding on wool when dyed in an acid bath fast red-violet to blue and dark green tints.

10. As new products the chromium compounds of the dyestuffs corresponding with the general formula:

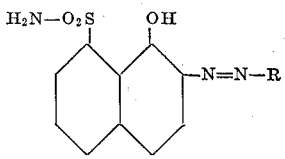

wherein the naphthalene nucleus contains at least one more substituent, R standing for an aromatic nucleus carrying a hydroxyl group in ortho position to the azo-bridge, not carrying any carboxyl group and containing at the most one nitro group, which dyestuffs form dark powders, dissolving in water with red-violet to blue, in dilute caustic soda solution with red-violet colorations and yielding on wool, when dyed in an acid bath, fast violet to blue and dark green tints.

11. As new products the chromium compounds of the dyestuffs corresponding with the general formula:

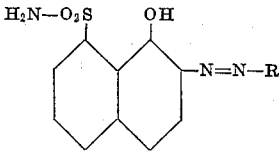

wherein the naphthalene nucleus carries one more substituent corresponding with the general formula $SO_2X$ ($X=OH$ or $NH_2$), R standing for an aromatic nucleus carrying a hydroxyl group in ortho position to the azo-bridge, not carrying any carboxyl group and containing at the most one nitro group, which dyestuffs form dark powders, dissolving in water with red-violet to blue, in dilute caustic soda solution with red-violet colorations and yielding on wool, when dyed in an acid bath, fast violet to blue and dark green tints.

12. As new products the chromium compounds of the dyestuffs corresponding with the general formula:

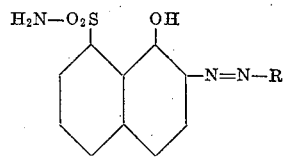

wherein the naphthalene nucleus carries one more $SO_2NH_2$ group, R standing for an aromatic nucleus carrying a hydroxyl group in ortho position to the azo-bridge, not carrying any carboxyl group and containing at the most one nitro group, which dyestuffs form dark powders, dissolving in water with red-violet to blue, in dilute caustic soda solution with red-violet colorations and yielding on wool, when dyed in an acid bath, fast violet to blue and dark-green tints.

13. Material dyed with the dyestuffs of claim 7.

14. Material dyed with the dyestuffs of claim 8.

15. Material dyed with the dyestuffs of claim 9.

16. Material dyed with the dyestuffs of claim 10.

17. Material dyed with the dyestuffs of claim 11.

18. Material dyed with the dyestuffs of claim 12.

In witness whereof we have hereunto signed our names this 25th day of March, 1925.

FRITZ STRAUB.
HERMANN SCHNEIDER.